United States Patent
Farnsworth et al.

(10) Patent No.: US 11,728,498 B2
(45) Date of Patent: Aug. 15, 2023

(54) PI CONTROL PARTIAL DERIVATIVE BASED I-TERM FOR WIND-UP PREVENTION

(71) Applicant: TOYOTA MOTOR ENGINEERING & MANUFACTURING NORTH AMERICA, INC., Plano, TX (US)

(72) Inventors: Jared M. Farnsworth, San Francisco, CA (US); Daniel C. Folick, Long Beach, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/527,749

(22) Filed: Nov. 16, 2021

(65) Prior Publication Data

US 2023/0155149 A1    May 18, 2023

(51) Int. Cl.
| | |
|---|---|
| *H01M 8/04992* | (2016.01) |
| *H01M 8/04701* | (2016.01) |
| *H01M 8/04029* | (2016.01) |
| *H01M 8/0432* | (2016.01) |
| *H01M 8/04298* | (2016.01) |

(52) U.S. Cl.
CPC ... *H01M 8/04992* (2013.01); *H01M 8/04029* (2013.01); *H01M 8/04358* (2013.01); *H01M 8/04723* (2013.01); *H01M 8/0432* (2013.01); *H01M 8/04298* (2013.01); *H01M 8/04701* (2013.01); *H01M 2250/20* (2013.01)

(58) Field of Classification Search
CPC ......... H01M 8/04992; H01M 8/04029; H01M 8/04358; H01M 8/04723; H01M 8/04298; H01M 8/04701; H01M 8/04708; H01M 8/04716; H01M 8/04731; H01M 8/04738; H01M 2250/20

See application file for complete search history.

(56) References Cited

U.S. PATENT DOCUMENTS

| | | |
|---|---|---|
| 6,317,637 B1 | 11/2001 | Limroth |
| 6,766,776 B2 | 7/2004 | Jiang et al. |
| 10,720,655 B2 | 7/2020 | Farnsworth et al. |
| 2004/0100221 A1 | 5/2004 | Fu |
| 2006/0190100 A1 | 8/2006 | Weggel |
| 2012/0065820 A1 | 3/2012 | Morris |
| 2012/0236258 A1 | 9/2012 | Shrestha et al. |
| 2016/0020476 A1* | 1/2016 | Crisalle ............ H01M 8/04753 324/426 |
| 2019/0165387 A1* | 5/2019 | Farnsworth ............ B60L 50/72 |
| 2020/0222609 A1 | 7/2020 | Ballantyne et al. |
| 2020/0328593 A1 | 10/2020 | Goetz |
| 2021/0053553 A1 | 2/2021 | Akanda et al. |

OTHER PUBLICATIONS

Wikipedia, Integral windup, Nov. 15, 2021, 2 pages, https://en.wikipedia.org/wiki/Integral_windup.

* cited by examiner

*Primary Examiner* — Matthew W Van Oudenaren

(74) *Attorney, Agent, or Firm* — Haynes and Boone, LLP

(57) ABSTRACT

The systems, devices, and methods described herein relate to heating and cooling automotive fuel cells. A proportional-integral-derivative (PID) controller may be used to control the temperature of fluid in the fuel cells. The PID may be configured to calculate and control the saturation limits of the I-term of the PID controller to reduce integral wind-up.

14 Claims, 9 Drawing Sheets

PI CONTROL PARTIAL DERIVATIVE BASED I-TERM FOR WIND-UP PREVENTION

TECHNICAL FIELD

The present disclosure is directed to a systems, devices, and methods for providing control for a proportional-integral-derivative (PID or PI) Controller. More specifically, the present disclosure is directed to calculating and controlling the saturation limits of the I-term of the PID controller to reduce integral wind-up.

BACKGROUND OF THE DISCLOSURE

The advent of new fuel cell technologies has produced new advances in vehicle design. These advances include new hybrid vehicles that operate using a combination of an engine and a motor-generator to further improve fuel economy, fully electric vehicles that operate based on power stored in a battery, and fuel cell vehicles that generate electricity by facilitating a chemical reaction.

Many vehicles employ multiple fuel cells in a fuel cell stack. These fuel cells may receive a fuel, which typically includes hydrogen, along with oxygen or another oxidizing agent. The fuel cell stack may facilitate a chemical reaction between the hydrogen and oxygen. This chemical reaction generates electricity and water as a byproduct. The electricity generated by the fuel cell stack may be stored in a battery or directly provided to a motor-generator to generate mechanical power to propel the vehicle. While fuel cell vehicles are an exciting advance in the automobile industry, the technology is relatively new, providing space for improvements to the technology.

It is desirable for fuel cells to operate within a predetermined temperature range. If the temperature is too low, then the power output by the fuel cells may likewise be relatively low. If the temperature is too high then the fuel cells may dry out, damaging or destroying the fuel cells. Some existing fuel cell systems rely on proportional-integral-derivative (PID or PI) controllers to maintain the temperature of fuel cell within an optimal temperature range. However, these systems are not optimized for highly non-linear conditions, such as those commonly occurring in fuel cell systems. In particular, Integral (I-term) Wind-up poses a serious challenge for these systems.

Thus, there is a need in the art for systems and methods for accurately controlling a temperature of a fuel cell stack use in a vehicle using a PID controller, and in particular, a need for preventing Integral Wind-up.

SUMMARY

In some example aspects, the present disclosure introduces a system for heating or cooling a fuel cell stack of a vehicle, which may include: a fuel cell stack having a plurality of fuel cells; an actuator having an actuator position and configured to increase or decrease a fluid temperature of a fluid in the plurality of fuel cells; and an electronic control unit (ECU) coupled to the actuator, the ECU including a proportional-integral-derivative (PID) controller; wherein the ECU is configured to: determine a temperature control signal corresponding to a target temperature of the fluid; perform a feedforward control of the actuator to cause the actuator to increase or decrease the fluid temperature toward the target temperature of the fluid; receive a feedback control signal from the PID controller, the feedback control signal based on an error signal that corresponds to an additional change in the actuator position to cause the fluid temperature to increase or decrease to reduce a temperature difference, wherein the feedback control signal applies an I-term saturation limit; and control the actuator based on a sum of the feedforward control and the feedback control signal.

In some implementations, the PID controller is configured to generate the feedback control signal by accounting for present error values, past error values, and potential future errors of the error signal. The PID controller may be configured to apply the I-term saturation limit according to the equations:

$$I-\text{term}_{max} = \Delta\text{Controlled}_{state\ allowed}\left(\frac{\partial I-\text{term}_{state}}{\partial \text{Controlled}_{state}}\right);$$

$$I-\text{term}_{min} = -\Delta\text{Controlled}_{state\ allowed}\left(\frac{\partial I-\text{term}_{state}}{\partial \text{Controlled}_{state}}\right);$$

and $$I-\text{term}_{limited}=\min(\max(I-\text{term}_{unlimited}, I-\text{term}_{min}), I-\text{term}_{max}).$$

The PID controller may be configured to apply the I-term saturation limit to a final PI combined feedback term according to the equations:

$$PI-term_{unlimited}=P-\text{term}_{unlimited}+I-\text{term}_{limited};$$

$$PI-\text{term}_{max} = \Delta\text{Controlled}_{state\ allowed}\left(\frac{\partial PIControl-\text{term}_{state}}{\partial \text{Controlled}_{state}}\right);$$

$$PI-\text{term}_{min} = -\Delta\text{Controlled}_{state\ allowed}\left(\frac{\partial PIControl-\text{term}_{state}}{\partial \text{Controlled}_{state}}\right);$$

and $$PI-term_{limited}=\min(\max(PI-term_{unlimited}, PI-term_{min}), PI-\text{term}_{max}).$$

The actuator may be a three-way valve. The target temperature of the fluid and the fluid temperature correspond to the fluid at an inlet of the fuel cell stack.

Example methods for heating or cooling a fuel cell stack of a vehicle are also provided, which may include: providing a fuel cell stack having a plurality of fuel cells; providing an actuator having an actuator position and configured to increase or decrease a fluid temperature of a fluid in the plurality of fuel cells; and providing an electronic control unit (ECU) coupled to the actuator, the ECU including a proportional-integral-derivative (PID) controller; with the ECU, determining a temperature control signal corresponding to a target temperature of the fluid; with the ECU, performing a feedforward control of the actuator to cause the actuator to increase or decrease the fluid temperature toward the target temperature of the fluid; with the ECU, receiving a feedback control signal from the PID controller, the feedback control signal based on an error signal that corresponds to an additional change in the actuator position to cause the fluid temperature to increase or decrease to reduce a temperature difference, wherein the feedback control signal applies a I-term saturation limit; and controlling the actuator based on a sum of the feedforward control and the feedback control signal.

In some implementations, the method further comprises generating the feedback control signal with the PID controller by accounting for present error values, past error values, and potential future errors of the error signal. The method may include applying the I-term saturation limit with the PID controller according to the equations:

$$I-\text{term}_{max} = \Delta \text{Controlled}_{state\ allowed}\left(\frac{\partial I-\text{term}_{state}}{\partial \text{Controlled}_{state}}\right);$$

$$I-\text{term}_{min} = -\Delta \text{Controlled}_{state\ allowed}\left(\frac{\partial I-\text{term}_{state}}{\partial \text{Controlled}_{state}}\right);$$

and $$I-\text{term}_{limited}=\min(\max(I-\text{term}_{unlimited},\ I-\text{term}_{min}),I-\text{term}_{max}).$$

The method may include applying the I-term saturation limit to a final PI combined feedback term with the PID controller according to the equations:

$$PI-\text{term}_{unlimited}=P-\text{term}_{unlimited}+I-\text{term}_{limited};$$

$$PI-\text{term}_{max} = \Delta \text{Controlled}_{state\ allowed}\left(\frac{\partial PIControl-\text{term}_{state}}{\partial \text{Controlled}_{state}}\right);$$

$$PI-\text{term}_{min} = \Delta \text{Controlled}_{state\ allowed}\left(\frac{\partial PIControl-\text{term}_{state}}{\partial \text{Controlled}_{state}}\right);$$

and $$PI-\text{term}_{limited}=\min(\max(PI-\text{term}_{unlimited},PI-\text{term}_{min}),PI-\text{term}_{max}).$$

In some implementations, the actuator is a three-way valve. The target temperature of the fluid and the fluid temperature may correspond to the fluid at an inlet of the fuel cell stack.

Example systems for heating or cooling a fuel cell circuit of a vehicle are also provided, which may include: a fuel cell stack having a plurality of fuel cells and configured to receive a fluid and to heat the fluid; an actuator having an actuator position and configured to increase or decrease a fluid temperature of the fluid; and an electronic control unit (ECU) coupled to the actuator, the ECU configured to: determine a temperature control signal corresponding to a target temperature of the fluid; perform a feedforward control of the actuator to cause the actuator to increase or decrease the fluid temperature towards the target temperature of the fluid; determine a temperature difference between the fluid temperature of the fluid and the target temperature of the fluid; determine a sensitivity that corresponds a change in a parameter value or the actuator position to a change in the fluid temperature; apply the sensitivity to the temperature difference to determine an error signal that corresponds to an additional change in the actuator position to cause the fluid temperature to increase or decrease to reduce the temperature difference; receive a feedback control signal from a PID controller, the feedback control signal based on the error signal, wherein the feedback control signal applies a I-term saturation limit; and control the actuator based on the error signal.

In some implementations, the PID controller is part of the ECU. The PID controller may be configured to generate the feedback control signal by accounting for present error values, past error values, and potential future errors of the error signal. The PID controller may be configured to apply the I-term saturation limit according to the equations:

$$I-\text{term}_{max} = \Delta \text{Controlled}_{state\ allowed}\left(\frac{\partial I-\text{term}_{state}}{\partial \text{Controlled}_{state}}\right);$$

$$I-\text{term}_{min} = -\Delta \text{Controlled}_{state\ allowed}\left(\frac{\partial I-\text{term}_{state}}{\partial \text{Controlled}_{state}}\right);$$

and $$I-\text{term}_{limited}=\min(\max(I-\text{term}_{unlimited},\ I-\text{term}_{min}),I-\text{term}_{max}).$$

The PID controller may be configured to apply the I-term saturation limit to a final PI combined feedback term according to the equations:

$$PI-\text{term}_{unlimited}=P-\text{term}_{unlimited}+I-\text{term}_{limited};$$

$$PI-\text{term}_{max} = \Delta \text{Controlled}_{state\ allowed}\left(\frac{\partial PIControl-\text{term}_{state}}{\partial \text{Controlled}_{state}}\right);$$

$$PI-\text{term}_{min} = \Delta \text{Controlled}_{state\ allowed}\left(\frac{\partial PIControl-\text{term}_{state}}{\partial \text{Controlled}_{state}}\right);$$

and $$PI-\text{term}_{limited}=\min(\max(PI-\text{term}_{unlimited},PI-\text{term}_{min}),PI-\text{term}_{max}).$$

In some implementations, the actuator is a three-way valve. The target temperature of the fluid and the fluid temperature may correspond to the fluid at an inlet of the fuel cell stack. The ECU may be further configured to control the actuator based on a sum of the feedforward control and the feedback control signal.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for heating and cooling fuel cells of a fuel cell circuit. In particular, the present disclosure describes systems and methods for providing feedback control of actuators of the fuel cell circuit to increase or decrease a fluid temperature. The systems provide various benefits and advantages such as adjusting control of different actuators based on temperature discrepancies at different locations, which results in more accurate control of the actuators. The systems further advantageously prevent I-term wind-up by calculating and controlling the I-term as discussed herein. In particular, I-term saturation may be based on the system sensitivity (partial derivative), allowing the limits to increase/decrease proportionally to the system response. An allowed learning limit based on the state being controlled can be defined and the partial derivative coverts the controlled state limit to the PI control state. Beyond just the I-term saturation, the partial derivative scaling method may be applied to the final PI combined feedback term as well.

An exemplary system includes a fuel cell stack and an actuator that can increase or decrease a fluid temperature of a fluid flowing through the fuel cell stack. The system further includes an electronic control unit (ECU). The ECU may include a PID controller. The ECU can determine a desired temperature of the fluid as well as a feedforward control signal for controlling the actuator to cause the fluid temperature to move towards the desired temperature. The ECU can also determine a temperature difference between the fluid temperature at a location and the desired temperature at the location, as well as a sensitivity. The ECU then applies the sensitivity to the temperature difference to determine an error signal corresponding to an error in the actuator position, and then controls the actuator based on the error signal to cause the fluid temperature to become closer in value to the desired temperature. The ECU may also receive feedback from the PID controller, including an I-term based on a partial derivative to prevent integral wind-up. Feedback controls for a PID are discussed at length in U.S. Pat. No. 10,720,655, which is incorporated by reference herein in its entirety. Further methods for heating and cooling a fuel cell circuit of a vehicle are discussed in U.S. Pat. No. 10,777,831, which is incorporated by reference herein in its entirety.

Figure 1:
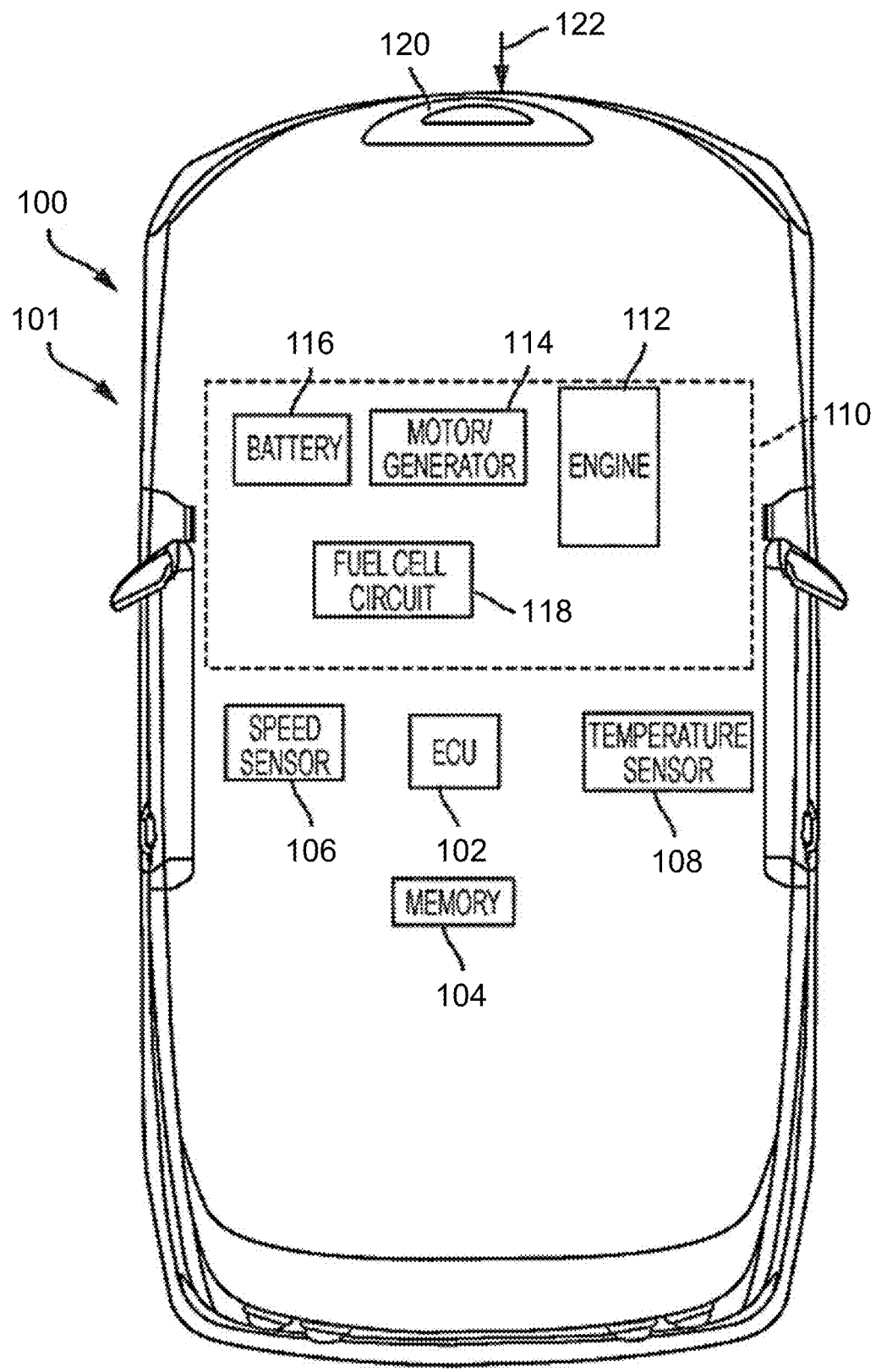
FIG. 1 is a block diagram illustrating various components of a vehicle having a fuel cell circuit capable of generating electricity based on a chemical reaction according to an embodiment of the present invention.

FIG. 1 shows a diagram of a vehicle 100 including components of a system 101 for controlling a temperature of fuel cells of the vehicle 100. In some implementations, the vehicle 100 and system 101 include an ECU 102, a memory 104, a speed sensor 106, and a temperature sensor 108. The vehicle 100 further includes a power source 110 which may include at least one of an engine 112, a motor-generator 114, a battery 116, or a fuel cell circuit 118.

The ECU 102 may be coupled to each of the components of the vehicle 100 and may include one or more processors or controllers which may be specifically designed for automotive systems. The functions of the ECU 102 may be implemented in a single ECU or in multiple ECUs. The ECU 102 may receive data from components of the vehicle 100, may make determinations based on the received data, and may control the operation of components based on the determinations. In that regard, the ECU 102 may control various aspects of the system 101 as well as well as aspects of the vehicle itself (such as steering, braking, accelerating, or the like).

The memory 104 may include any non-transitory memory known in the art. In that regard, the memory 104 may store machine-readable instructions usable by the ECU 102 and may store other data as requested by the ECU 102.

The speed sensor 106 may be any speed sensor capable of detecting data usable to determine a speed of the vehicle 100. For example, the speed sensor 106 may include a GPS sensor or an IMU sensor. The speed sensor 106 may also or instead include an angular velocity sensor configured to detect an angular velocity of the wheels of the vehicle 100 or the engine, a speedometer, or the like.

The temperature sensor 108 may include one or more temperature sensor capable of detecting data usable to determine an ambient temperature within a portion of the vehicle 100 or outside of the vehicle 100. For example, the temperature sensor 108 may include a thermocouple, a thermometer, an infrared temperature sensor, a thermistor, or the like.

The engine 112 may convert a fuel into mechanical power. In that regard, the engine 112 may be a gasoline engine, a diesel engine, or the like. The battery 116 may store electrical energy. In some implementations, the battery 116 includes one or more energy storage devices including a battery, a fly-wheel, a super-capacitor, a thermal storage device, or other energy storage devices.

The fuel cell circuit 118 may include a plurality of fuel cells that facilitate a chemical reaction to generate electrical energy. In that regard, the electrical energy generated by the fuel cell circuit 118 may be stored in the battery 116. In some embodiments, the vehicle 100 may include multiple fuel cell circuits including the fuel cell circuit 118.

The motor/generator 114 may convert the electrical energy stored in the battery (or electrical energy received directly from the fuel cell circuit 118) into mechanical power usable to propel the vehicle. The motor/generator 114 may further convert mechanical power received from the engine 112 or wheels of the vehicle into electricity, which may be stored in the battery 116 as energy and/or used by other components of the vehicle. In some embodiments, the motor-generator 114 may also or instead include a turbine or other device capable of generating thrust.

Figure 2:
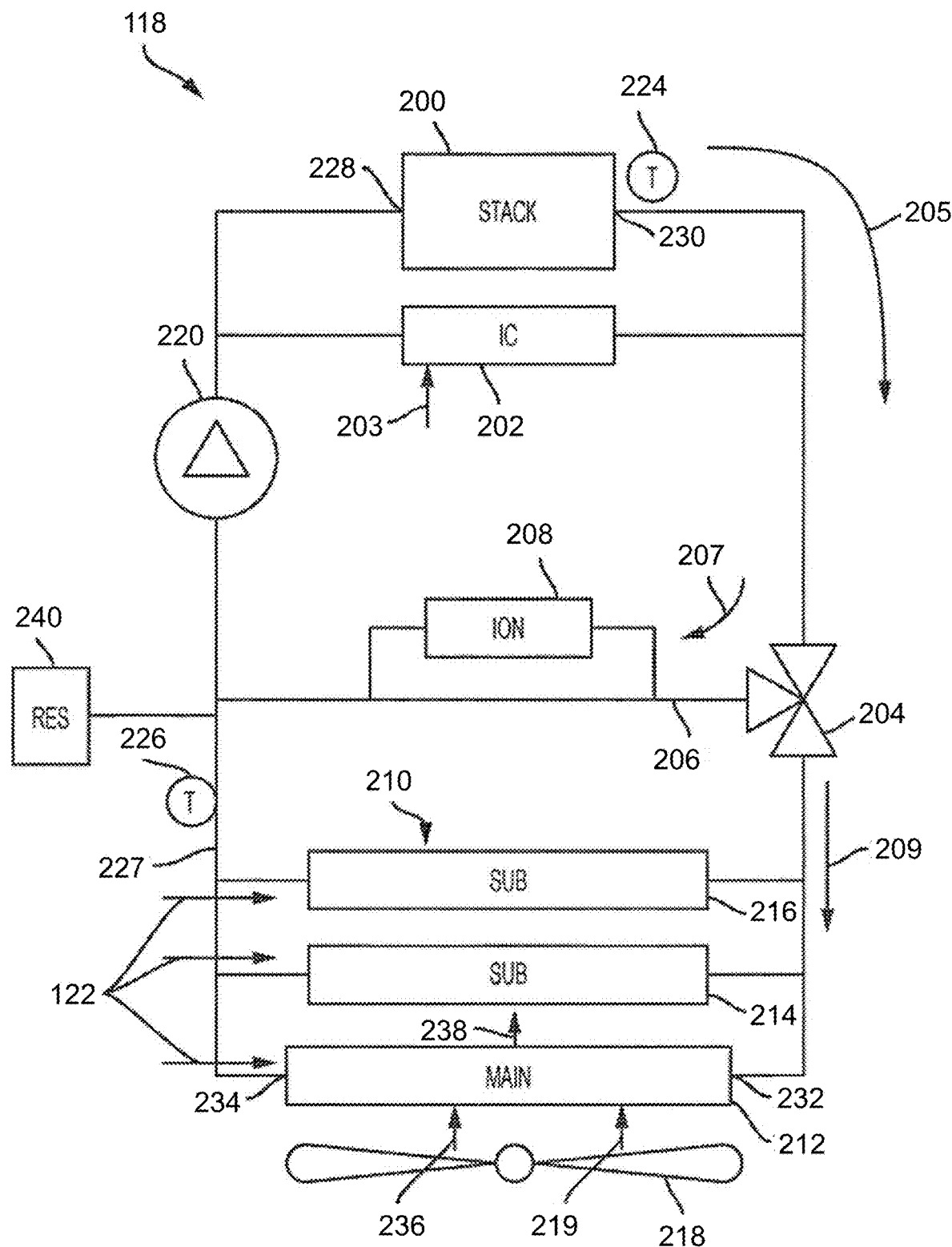
FIG. 2 is a block diagram illustrating various features of the fuel cell circuit of FIG. 1 according to an embodiment of the present invention.

Additional details of the fuel cell circuit 118 are illustrated in FIG. 2. In some implementations, the fuel cell circuit 118 includes a fuel cell stack 200 having a plurality of fuel cells. The fuel cells may each facilitate a chemical reaction to generate electricity. The reaction may generate heat. Furthermore, a fluid may flow through the fuel cell stack 200 and may transfer at least some of the heat away from the fuel cell stack 200. In that regard, the fuel cell stack 200 may include an inlet 228 for receiving the fluid and an outlet 230 through which the fluid exits the fuel cell stack 200.

It may be desirable for the fuel cell stack 200 to operate within a predetermined temperature range. For example, it may be desirable for the fuel cells of the fuel cell stack 200 to operate between 50 degrees Celsius (50 degrees C., 122 degrees Fahrenheit (122 degrees F.)) and 80 degrees C. (176 degrees F.).

The fuel cell stack 200 may generate more electrical energy at relatively high temperatures (i.e., when the temperature is closer to 80 degrees C. than 50 degrees C.). However, the fuel cell stack 200 may undesirably lose moisture (i.e., may dry out) when operated at these relatively high temperatures. In that regard, it may be desirable for the fuel cell stack 200 to operate closer to 80 degrees C. when a relatively large amount of electrical energy is requested, and closer to 50 degrees C. when a relatively small amount of electrical energy is requested. The fuel cell circuit 118 includes various features for increasing or decreasing the temperature of the fuel cell stack 200.

The fuel cell circuit 118 may further include an intercooler 202. The intercooler 202 may be oriented in parallel with the fuel cell stack 200. The intercooler 202 may receive a hot airflow 203 (i.e., an airflow having a greater temperature than the temperature of the fluid within the intercooler 202) and may transfer heat from the hot airflow 203 to the fluid. Accordingly, the fuel cell stack 200 and the intercooler 202 may be considered heating elements of the fuel cell circuit 118 as they both increase the temperature of the fluid. All of the fluid within the fuel cell circuit 118 eventually flows through the combination of the fuel cell stack 200 and the intercooler 202 as shown by an arrow 205.

The fuel cell circuit 118 may further include an actuator which may be a three-way valve 204. The fuel cell circuit 118 may also include one or more radiator 210 along with a bypass branch 206 that bypasses the one or more radiator 210. The three-way valve 204 may divide the fluid between the radiators 210 and the bypass branch 206 based on a valve position of the three-way valve 204. The three-way valve 204 may have multiple valve positions each dividing the flow between the bypass branch 206 and the radiators 210 at different ratios.

For example, the three-way valve 204 may have a first position in which 80% of the fluid flows through the bypass branch 206 (as shown by an arrow 207) and 20% of the fluid flows through the radiators 210 (as shown by an arrow 209). The three-way valve 204 may further have a second position in which 70% of the fluid flows through the bypass branch 206 and 30% of the fluid flows through the radiators 210. The three-way valve 204 may have multiple discrete valve positions or may have infinite continuous valve positions (i.e., may direct any value between 0% and 100% of the fluid through each of the bypass branch 206 or the radiators 210).

The fluid that flows through the bypass branch 206 may avoid the radiators 210, thus allowing a majority of heat within the fluid to remain in the fluid. An ionizer 208 may receive some of the fluid that flows through the bypass branch 206. The ionizer 208 may function as an ion exchanger and may remove ions from the fluid to reduce conductivity. In that regard, the ionizer may be referred to as a de-ionizer.

The radiators 210 may transfer heat away from the fluid to a gas (such as air) flowing over or past the radiators 210. In that regard, the radiators 210 may be referred to as cooling elements of the fuel cell circuit 118.

In some embodiments, the radiators 210 may include a main radiator 212 and two secondary radiators 214, 216. A fan 218 may be oriented in such a manner as to direct a flow of gas 219 over the radiators 210. In some embodiments, the fan 218 may only direct the flow of gas 219 over the main radiator 212. The main radiator 212 has a fluid inlet 232 in which the fluid flows into the main radiator 212 and a fluid outlet 234 in which the fluid flows out of the main radiator 212. The main radiator 212 may further include an air inlet 236 that receives the gas 219 (i.e., airflow) from the fan 218 as well as an air outlet 238 in which the airflow exits the main radiator 212.

Referring to FIGS. 1 and 2, one or more of the radiators 210 may further receive the airflow 122 received via the grill 120 of the vehicle 100. As mentioned above, the velocity of the airflow 122 corresponds to a speed of the vehicle 100. As the speed of the vehicle 100 increases, the velocity of the airflow 122 further increases, thus increasing the transfer of heat away from the fluid.

Returning reference to FIG. 2, the fuel cell circuit 118 may further include a pump 220. The pump 220 may include any pump capable of forcing the fluid through the fuel cell circuit 118. For example, the pump 220 may include a hydraulic pump, a diaphragm pump, a piston pump, a rotary gear pump, or the like.

The fuel cell circuit 118 may further include a reservoir 240. The reservoir may include a volume in which the fluid, such as a coolant, is stored. The fluid may be provided to the fuel cell circuit 118 from the reservoir 240. In some embodiments, the reservoir 240 may include a port through which a user of the vehicle may provide the fluid to the reservoir 240.

The fuel cell circuit 118 may further include two temperature sensors including a first temperature sensor 224 and a second temperature sensor 226. The first temperature sensor 224 may detect the temperature of the fluid exiting the fuel cell stack 200 at the outlet 230. The second temperature sensor 226 may detect the temperature of the combined fluid exiting the radiators 210. In some embodiments, greater or fewer temperature sensors may be used, and the temperature sensors may be positioned at additional or alternative locations.

Referring again to FIGS. 1 and 2, the ECU 102 may determine a target temperature of the fuel cell stack 200 based on a received power request of the vehicle 100. As described above, it may be desirable for the temperature of the fuel cell stack 200 to increase when a relatively large amount of power is requested from the fuel cell stack 200. This is because the increased temperature corresponds to an increased power output of the fuel cell stack 200. Likewise, it may be desirable for the temperature of the fuel cell stack 200 to decrease when a relatively small amount of power is requested from the fuel cell stack 200 in order to retain moisture in the fuel cell stack 200.

The ECU 102 may also receive the detected temperatures from the first temperature sensor 224 and the second temperature sensor 226. The ECU 102 may then control the actuators of the fuel cell circuit 118 (the three-way valve 204, the fan 218, and the pump 220) to cause the temperature of the fuel cell stack 200 (such as the temperature of the fluid at the outlet 230) to increase or decrease. The ECU 102 may cause the temperature to increase or decrease towards the target temperature based on the target temperature and the detected temperatures.

The three-way valve 204 may be used to adjust the temperature of the fluid by directing more of the fluid through the bypass branch 206 or through the radiators 210. For example, if the three-way valve 204 increases a flow of the fluid through the bypass branch 206 then the overall temperature of the fluid may increase because it is directed back towards the heating elements without significant loss of heat. Similarly, if the three-way valve 204 increases a flow of the fluid through the radiators 210 then the overall temperature of the fluid may decrease because more fluid is directed through the radiators 210 where thermal energy may be removed from the fluid.

In some implementations, the three-way valve is driven by the ECU 102, and in particular, may be driven according to one or more of a feedforward signal and feedback signal. The feedback signal may be calculated by a PID controller implementing a partial derivative I-term to reduce or prevent integral windup during a heating or cooling process, as shown more particular with reference to FIG. 3.

The fan 218 may likewise be used to adjust the temperature of the fluid by increasing or decreasing the flow of gas 219 over the main radiator 212. For example, if the speed of the fan 218 is increased (resulting in a greater quantity of gas 219 flowing over the main radiator 212) then the temperature of the fluid may decrease as more thermal energy is transferred out of the fluid. Similarly, if the speed of the fan 218 is decreased then the temperature of the fluid may increase as less thermal energy is transferred out of the fluid.

The pump 220 may also be used to indirectly adjust the temperature of the fluid by increasing or decreasing a flow rate, such as a mass flow rate, of the fluid through the fuel cell circuit 118. As the flow rate increases, heat transfer between the fluid and the various components increases, which may result in an increase or decrease in temperature based on how much of the fluid flows through the bypass branch 206 or the radiators 210, and based on a temperature of the fuel cell stack 200. Thus, the temperature of the fluid may correspond to the flow rate of the fluid.

Figure 3:
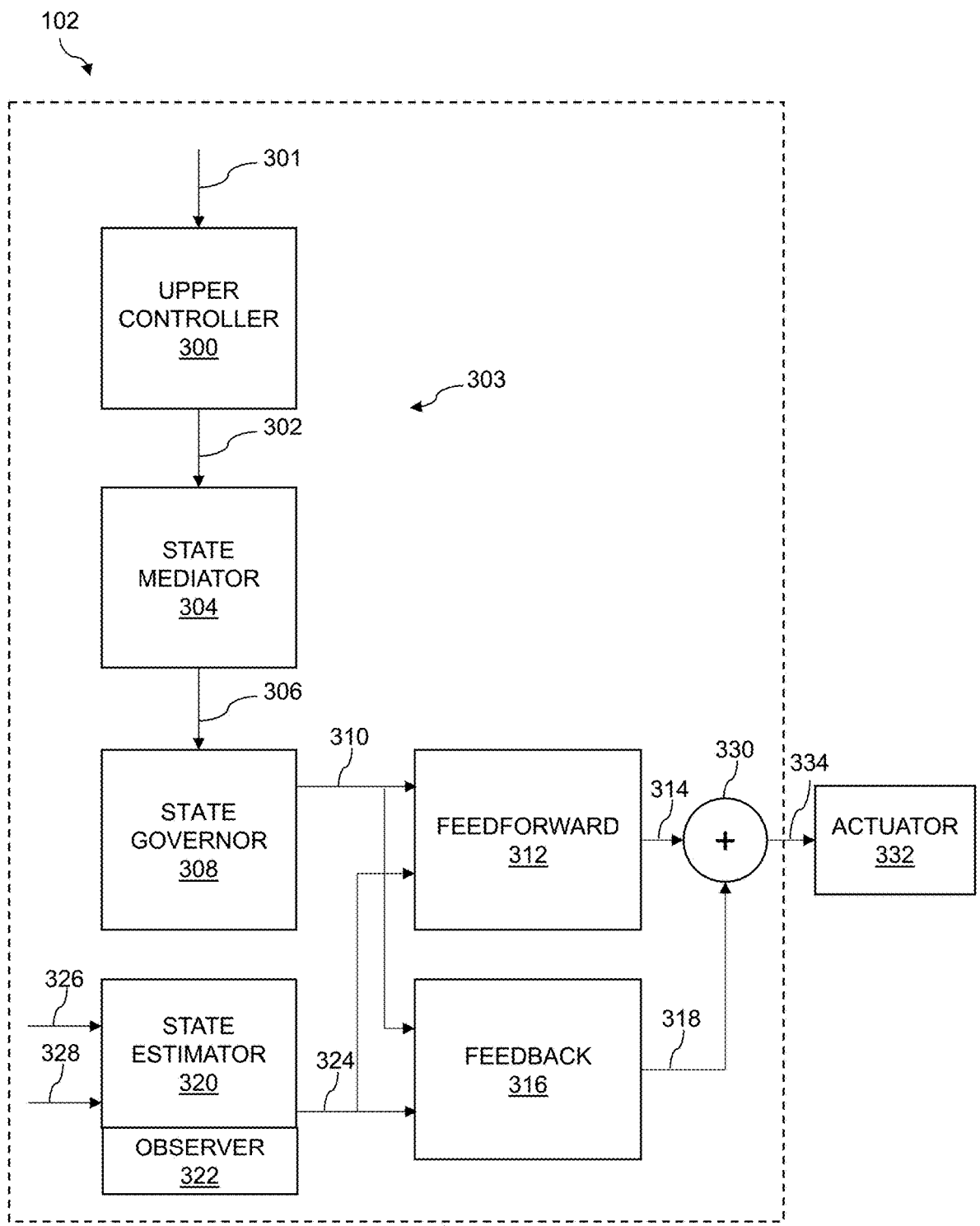
FIG. 3 is a block diagram illustrating various logic components of an electronic control unit (ECU) of the vehicle of FIG. 1 for increasing or decreasing a temperature of fluid in the fuel cell circuit according to an embodiment of the present invention.

Referring now to FIGS. 2 and 3, the ECU 102 may include a temperature control system 303 that controls the temperature of the fuel cell circuit 118. The temperature control system 303 may be implemented using specifically designated hardware of the ECU 102, or may be implemented using general hardware of the ECU 102.

The temperature control system 303 may include an upper controller 300, a state mediator 304, a state governor 308, a feedforward control 312, a feedback control 316, a state estimator 320, an observer 322, and an actuator control 330. The temperature control system 303 may receive an input, such as a power request 301, and may generate an output, such as an actuator control signal 334.

The upper controller 300 may receive the power request 301. The upper controller 300 may then identify a target temperature of the fuel cell stack 200 based on the power request 301. For example, if the power request is relatively large then the upper controller 300 may set a target temperature to be relatively high, such as 75 degrees C. (167 degrees F.). Likewise, if the power request is relatively small then the upper controller 300 may set a target temperature to be relatively low, such as 55 degrees C. (131 degrees F.). The upper controller 300 may then output an unfiltered target fuel cell temperature 302.

The state mediator 304 may receive the unfiltered target fuel cell temperature 302. The state mediator 304 may filter the received signal and output a target fuel cell temperature 306. The state mediator 304 may filter the unfiltered target fuel cell temperature 302 for various reasons. For example, the filtering may remove noise on the signal, may act as a bandpass filter to ensure that the target fuel cell temperature 306 is within a safe temperature range, or the like. The safe temperature range may correspond to a temperature range at which the temperature is unlikely to damage components of the fuel cell circuit 118 (i.e., such as by overheating or drying out) and at which the fuel cell circuit 118 is capable of generating power.

The state governor 308 may receive the target fuel cell temperature 306. The state governor 308 may generally dictate how fast the temperature of the fluid in the fuel cell circuit 118 should respond to the temperature change request (i.e., how fast the temperature should increase or decrease). The state governor 308 may output a temperature rate of change 310 corresponding to a desired rate of temperature change of the fluid (such as at the inlet 228 or the outlet 230 of the fuel cell stack 200). For example, the temperature rate of change 310 may be measured in degrees (e.g., degrees C.) per second.

The state estimator 320 may receive inputs including sensor values 326 and current actuator positions 328 (or commanded actuator positions) and may estimate conditions at various locations of the fuel cell circuit 118. The sensor values may include, for example, temperatures detected from the first temperature sensor 224 and the second temperature sensor 226. The actuator positions 328 may be received from the actuators 332 themselves (the pump 220, the three-way valve 204, and the fan 218) or from the actuator control signal 334.

The fuel cell circuit 118 includes relatively few sensors. Additional data is desirable in order to provide optimal control of the actuators 332. In that regard, the state estimator 320 may calculate or predict the additional data (i.e., current conditions) based on the sensor values 326 and the actuator positions 328. For example, the state estimator 320 may calculate or predict temperatures at locations of the fuel cell circuit 118 in which temperature sensors are not present. As another example, the state estimator 320 may calculate or predict pressure of the fluid at various locations of the fuel cell circuit 118. As yet another example, the state estimator 320 may further calculate or predict quantities of heat added to or subtracted from the fluid by the various elements of the fuel cell circuit 118. The state estimator 320 may output calculated or predicted values 324 corresponding to current conditions of the fuel cell circuit 118.

The feedforward control 312 may receive the temperature rate of change 310 from the state governor 308 along with the calculated or predicted values 324 from the state estimator 320. In some embodiments, the feedforward control 312 may further receive the detected temperatures from the temperature sensors. The feedforward control 312 may determine desired positions of the actuators 332 to achieve the desired temperature rate of change 310 of the fluid of the fuel cell circuit 118. The feedforward control 312 may determine these desired positions based on the received temperature rate of change 310 and the calculated or predicted values 324. The feedforward control 312 may output feedforward control signals 314 corresponding to the determined desired positions of the actuators 332.

The feedback control 316 may also receive the temperature rate of change 310 from the state governor 308 along with the calculated or predicted values 324 from the state estimator 320. In some embodiments, the feedback control 316 may further receive the detected temperatures from the temperature sensors. The feedback control 316 may identify whether the actuators 332 are achieving the desired temperature rate of change 310. The feedback control 316 may further generate feedback control signals 318 that correspond to adjustments to the actuators 332 to close the gap between a measured temperature rate of change and the desired temperature rate of change 310.

The observer 322 may operate as feedback control for the radiators 210. In that regard, the observer may determine a difference between a detected temperature at the outlet 227 of the radiators 210 and an estimated temperature at the outlet 227 as determined by the state estimator 320. The observer 322 may then change values determined by the state estimator 320 to cause the estimated temperature to be closer in value to the detected temperature.

The actuator control 330 may receive the feedforward control signals 314 and the feedback control signals 318 and generate actuator control signals 334 based on the combination of the feedforward control signals 314 and the feedback control signals 318. One or more of the actuator control signals 334 may be transmitted to each of the actuators 332. For example, the actuator control signals 334 may include a first signal that controls a valve position of the three-way valve 204, a second signal that controls a fan speed of the fan 218, and a third signal that controls a pump speed of the pump 220. In some embodiments, the actuator control 330 may generate the actuator control signals 334 by adding the feedforward control signals 314 and the feedback control signals 318.

Figure 4:
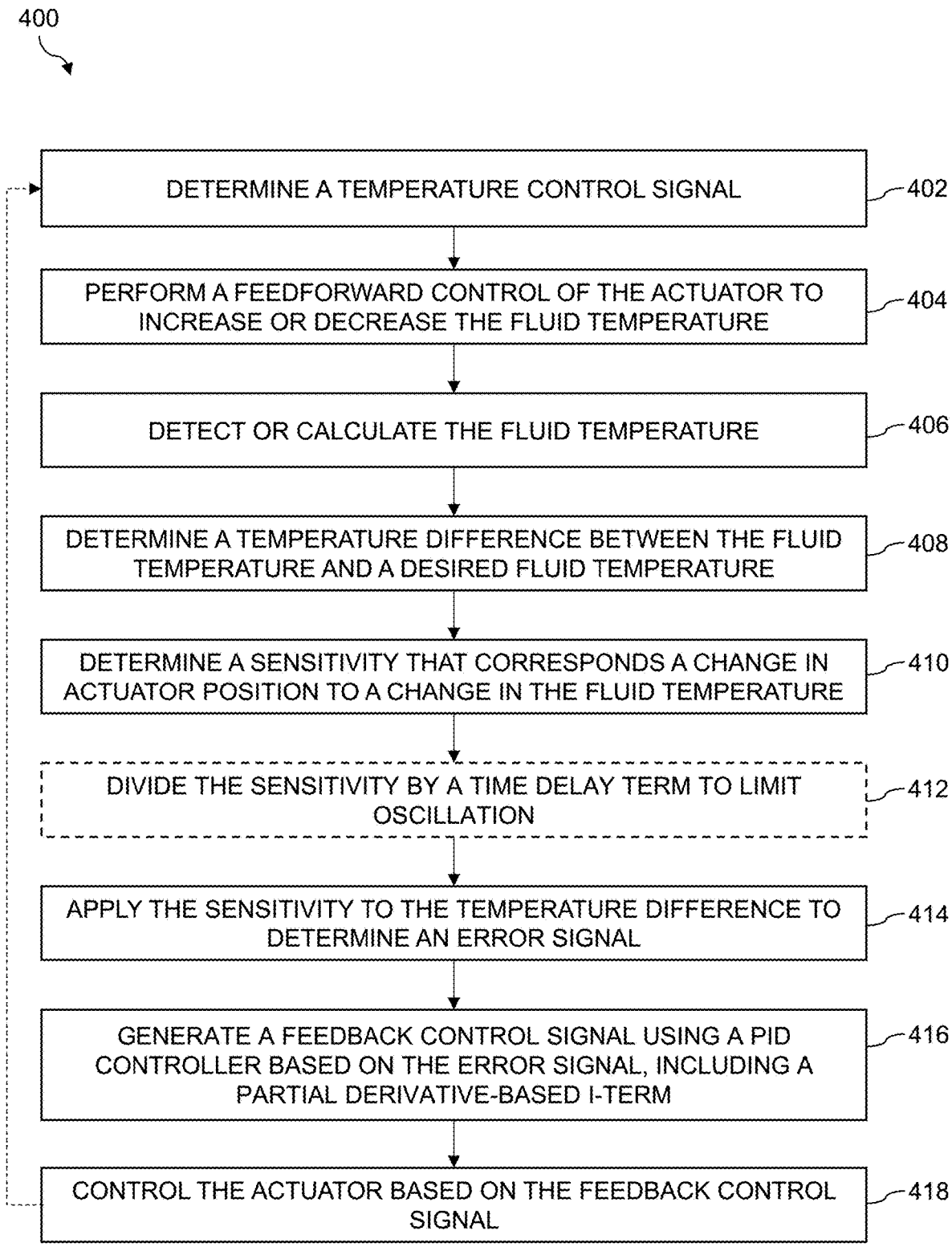
FIG. 4 is a flowchart illustrating a method for heating or cooling a fuel cell circuit according to an embodiment of the present invention.

FIG. 4 shows a method 400 for feedback-based heating or cooling of a fuel cell circuit. The fuel cell circuit may be the fuel cell circuit shown in FIGS. 1 and 2. In some implementations, the method 400 is performed by a feedback control, such as the feedback control 316 of FIG. 3.

The method 400 may include step 402 in which the ECU determines a temperature control signal corresponding to a desired temperature of the fluid in the fuel cell circuit. For example, the temperature control signal may correspond to a desired temperature of the fluid and may include, for example, a temperature rate of change. In some embodiments, the temperature control signal may be determined based on a desired temperature of the fluid at one or more location, such as at the inlet of the fuel cell stack. The temperature control signal may be determined using a state governor such as the state governor 308 of FIG. 3.

The method 400 may include step 404 in which the ECU performs a feedforward control of the actuator in order to increase or decrease the fluid temperature based on the temperature control signal. For example, the ECU may determine a feedforward control signal using a feedforward control such as the feedforward control 312 of FIG. 3. The feedforward control may be based on the temperature control signal and estimated values that were calculated using a state estimator (such as state estimator 320 of FIG. 3). In some implementations, the ECU directly controls one or more actuators of the fuel cell circuit using the feedforward control. In some implementations, the ECU directly controls one or more actuator using a combination of the feedforward control and feedback control.

The method 400 may include step 406 in which the fluid temperature of the fluid at one or more location is detected by a temperature sensor or calculated by the ECU, such as in a state estimator.

The method 400 may include step 408 in which the ECU determines a temperature difference between the detected or calculated fluid temperature and a desired temperature of the fluid at one or more location. For example, the ECU may determine a temperature difference between a detected or calculated temperature at an outlet of the fuel cell stack and a desired temperature of the fluid at the outlet of the fuel cell stack.

The method 400 may include step 410 in which the ECU determines or calculates a sensitivity. The sensitivity may correspond or associate a change in actuator position (including a physical change in actuator position, a change in an actuator control signal, or a change in parameter value used to determine the actuator control signal) to a change in the fluid temperature. For example, the sensitivity may indicate how much change in an actuator position of an actuator changes the fluid temperature of the fluid by 1 degree. As another example, the sensitivity may indicate how much a change in mass flow changes the fluid temperature of the fluid by 1 degree.

The method 400 may include optional step 412 in which the ECU divides the sensitivity by a time delay. This may be especially useful if the fluid temperature of the fluid is detected by a sensor. This is because the fluid temperature detected by a sensor may be delayed by one or more seconds, such as 1 to 5 seconds. In that regard, if control of the actuator is based on a time delayed sensor reading, the actuator control may oscillate due to the delayed reading. Dividing the sensitivity by the time delay results in a more gradual change in the actuator control, thus reducing the likelihood of oscillation of the actuator control.

In some embodiments, especially if the fluid temperature is calculated by the ECU rather than detected by a sensor having a time delay, step 412 may be skipped. This is because the calculation of the fluid temperature may have a relatively small delay, if any delay at all. Therefore, the actuator control may be based on a more current reading such that the time delay operation is unnecessary.

The temperature difference determined in step 408 may correspond to a temperature error. In other words, the temperature difference corresponds to an error because it is the difference between a desired temperature at the location and the actual temperature at the location. In that regard and in step 414, the sensitivity may be applied to the temperature difference in order to determine an error signal. The error signal may correspond to, or indicate, an error in the actuator position or an error in the parameter used to calculate the actuator position that caused the temperature difference. For example, the error signal may indicate that a pump is pumping the fluid through the fuel cell circuit at a mass flow rate that is either too low or too high. The error signal may further indicate or correspond to a difference in mass flow that will cause the actual temperature of the fluid to be relatively equal to the desired temperature of the fluid.

The method 400 may include step 416 in which the ECU passes the error signal through a proportional-integral-derivative (PID or PI) controller to generate a feedback control signal. The PID controller may analyze past and present values of the error signal and generate the feedback control signal based on these values. In particular, the PID controller may analyze a proportional term (P-term) which may be proportional to a current value of the error signal, an integral term (I-term) which may account for past values of the error signal and integrate them over time, and a derivative term (D-term) which may provide potential future errors of the error signal based on its current rate of change. The controller may balance the effect of the P, I, and D terms to optimize their control function.

Integral Wind-up is an issue that presents challenges for many PID controllers, especially in highly non-linear systems such as temperature control for fuel cells. These systems may have highly non-linear behavior that is not captured adequately by traditional methods. Existing systems to manage temperature using a PID controller generally set static upper and lower limits without including learning values, which may worsen problems with Integral Wind-up. In particular, this phenomenon may be caused by large changes in setpoints, causing the I-term to accumulate a significant error over time, which can cause significant overshooting or undershooting.

In some implementations, the I-term and total PI feedback amount (including the sum of the P-term and I-term) are saturated using a partial derivative calculation to capture the system sensitivity and non-linearity. In these implementations, the I-term of the PID controller may be calculated by traditional methods and/or by a partial derivative method. This may result in scaling the I-term saturation based on the system sensitivity and allowing the upper and lower limits to increase or decrease proportionally to the system response. Defining the I-term saturation limits may have the effect of optimizing the system for non-linear systems and may help to prevent Integral Wind-up in the fuel cell control systems as discussed herein. Setting the I-term saturation limits may be accomplished through the use of the following equations:

$$I - \text{term}_{max} = \Delta \text{Controlled}_{state\ allowed}\left(\frac{\partial I - \text{term}_{state}}{\partial \text{Controlled}_{state}}\right); \quad [\text{Eq. 1}]$$

$$I - \text{term}_{min} = -\Delta \text{Controlled}_{state\ allowed}\left(\frac{\partial I - \text{term}_{state}}{\partial \text{Controlled}_{state}}\right); \quad [\text{Eq. 2}]$$

$$I - \text{term}_{limited} = \min(\max(I - \text{term}_{unlimited}, I - \text{term}_{min}), I - \text{term}_{max}) \quad [\text{Eq. 3}]$$

The partial derivative term in Equations 1-3 above $$\left(\frac{\partial I - \text{term}_{state}}{\partial \text{Controlled}_{state}}\right)$$

may be calculated in real time based on the system states. The partial derivative term may represent the system sensitivity at the current system states and may capture non-linearity of the system.

The $\Delta \text{Controlled}_{state\ allowed}$ term in Equations 1-2 above may represent how much the I-term can contribute to closing the controlled state error. This may help to prevent Integral Wind-up by limiting the accumulation of errors in the I-term during a calculation process. For example, if the controlled stated is fuel cell (FC) inlet temperature, setting $\Delta \text{Controlled}_{state\ allowed} = 10$ means that the I-term can only grow enough to close a FC inlet temperature error of $\pm 10$ degrees C. In this example, the partial derivative term $$\left(\frac{\partial I - \text{term}_{state}}{\partial \text{Controlled}_{state}}\right)$$

will dynamically scale the I-term limits so that the I-term can only accumulate the equivalent of a $\pm 10$ degrees C. error in the controlled state.

In some implementations, the same method of scaling the I-term (e.g., according to Eqs. 1-3) can be applied to the final total PI combined feedback term (also referred to as the PI control value which may include the sum of the P-term and the I-term), such as through the use of the following equations:

$$PI - \text{term}_{unlimited} = P - \text{term}_{unlimited} + I - \text{term}_{limited}) \quad [\text{Eq. 4}]$$

$$PI - \text{term}_{max} = \Delta \text{Controlled}_{state\ allowed}\left(\frac{\partial PIControl - \text{term}_{state}}{\partial \text{Controlled}_{state}}\right) \quad [\text{Eq. 5}]$$

$$PI - \text{term}_{min} = -\Delta \text{Controlled}_{state\ allowed}\left(\frac{\partial PIControl - \text{term}_{state}}{\partial \text{Controlled}_{state}}\right) \quad [\text{Eq. 6}]$$

$$PI\text{-term}_{limited} = \min(\max(PI\text{-term}_{unlimited}, PI\text{-term}_{min}), PI\text{-term}_{max}) \quad [\text{Eq. 7}]$$

The method 400 may include step 418 in which the ECU controls the actuator based on the feedback control signal. For example, the ECU may generate a sum of the feedforward control signal and the feedback control signal and control the actuator based on the sum. In some implementations, the ECU controls the actuator based on the feedback control signal alone. In some exemplary implementations, the method 400 may include returning to step 402 after the completion of step 418 to proceed through the steps again.

Figure 5:
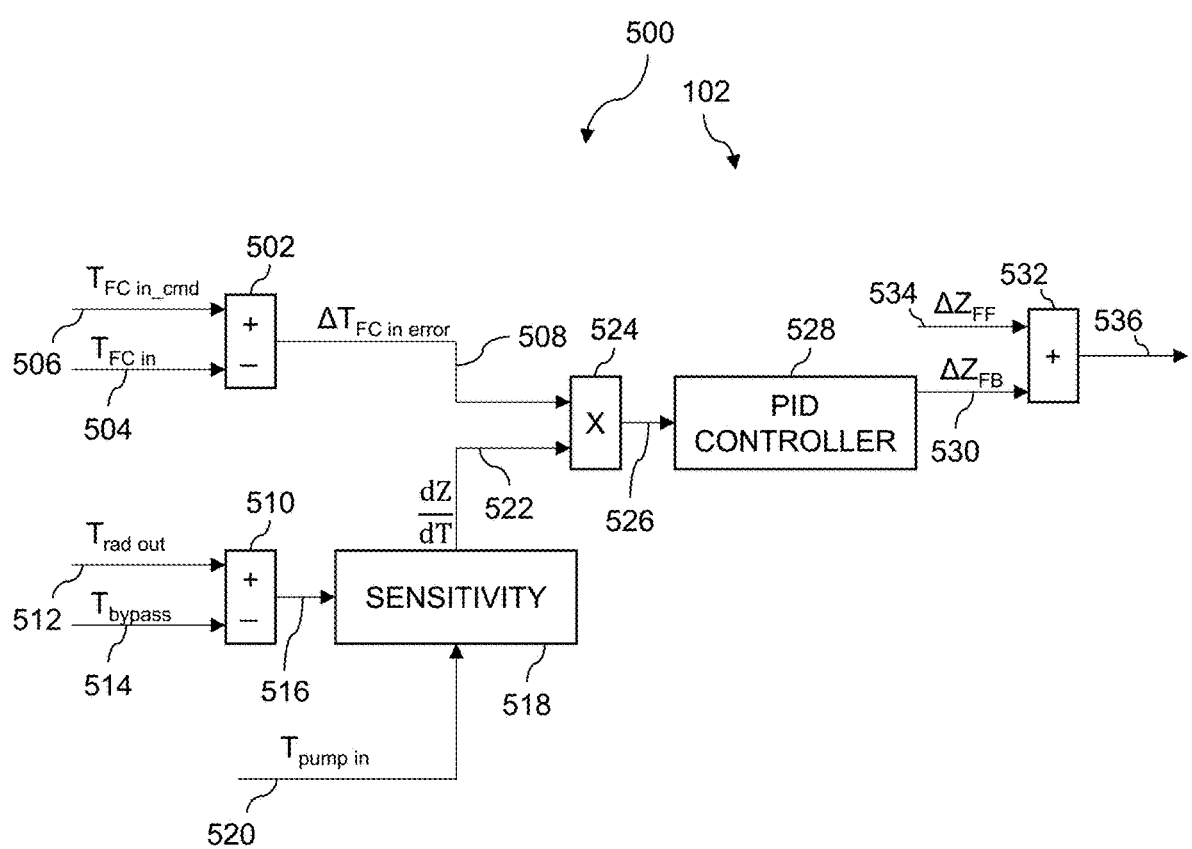
FIG. 5 is a block diagram illustrating a three-way valve controller for feedback-based control of a three-valve of a fuel cell circuit according to an embodiment of the present invention.

Referring to FIG. 5, a three-way controller 500 is shown. In some implementations, the three-way controller 500 is included in the ECU 102 of FIG. 2, and in particular, may carry out the feedback control 316. The three-way valve controller 500 may include logic or dedicated hardware designed to perform a method similar to the method 400 of FIG. 4 to perform feedback control of the three-way valve.

The three-way valve controller 500 may include a number of calculation blocks 502, 510, 524, 532 that receive various inputs and output signals. These may include difference block 502 which may receive a fluid temperature ($T_{FC\ in}$) 504 measured or calculated at the inlet of a fuel cell stack, such as fuel cell stack 200 in FIG. 2. For example, the fluid temperature 504 may be calculated by a state estimator of the ECU 102. The difference block 502 may further receive a desired temperature ($T_{FC\ in\_cmd}$) 506 corresponding to a desired temperature of the fluid at the inlet of the fuel cell stack. The difference block 502 may output a temperature difference ($\Delta T_{FC\ in\ error}$) 508 corresponding to a difference between the fluid temperature 504 and the desired temperature 506. In some implementations, the temperature difference 502 represents an amount of error compared to an expected fluid temperature.

The three-way valve controller 500 may further include a second difference block 510. The second difference block 510 may receive a radiator temperature ($T_{rad\ out}$) 512 corresponding to a temperature of the fluid at an outlet of a radiator. The second difference block 510 may further receive a bypass fluid temperature ($T_{bypass}$) 514 corresponding to a temperature of the fluid at a location along a bypass branch of the fuel cell circuit. In some implementations, the second difference block 510 outputs a difference 516 between the radiator temperature 512 and the bypass fluid temperature 514.

Figure 6:
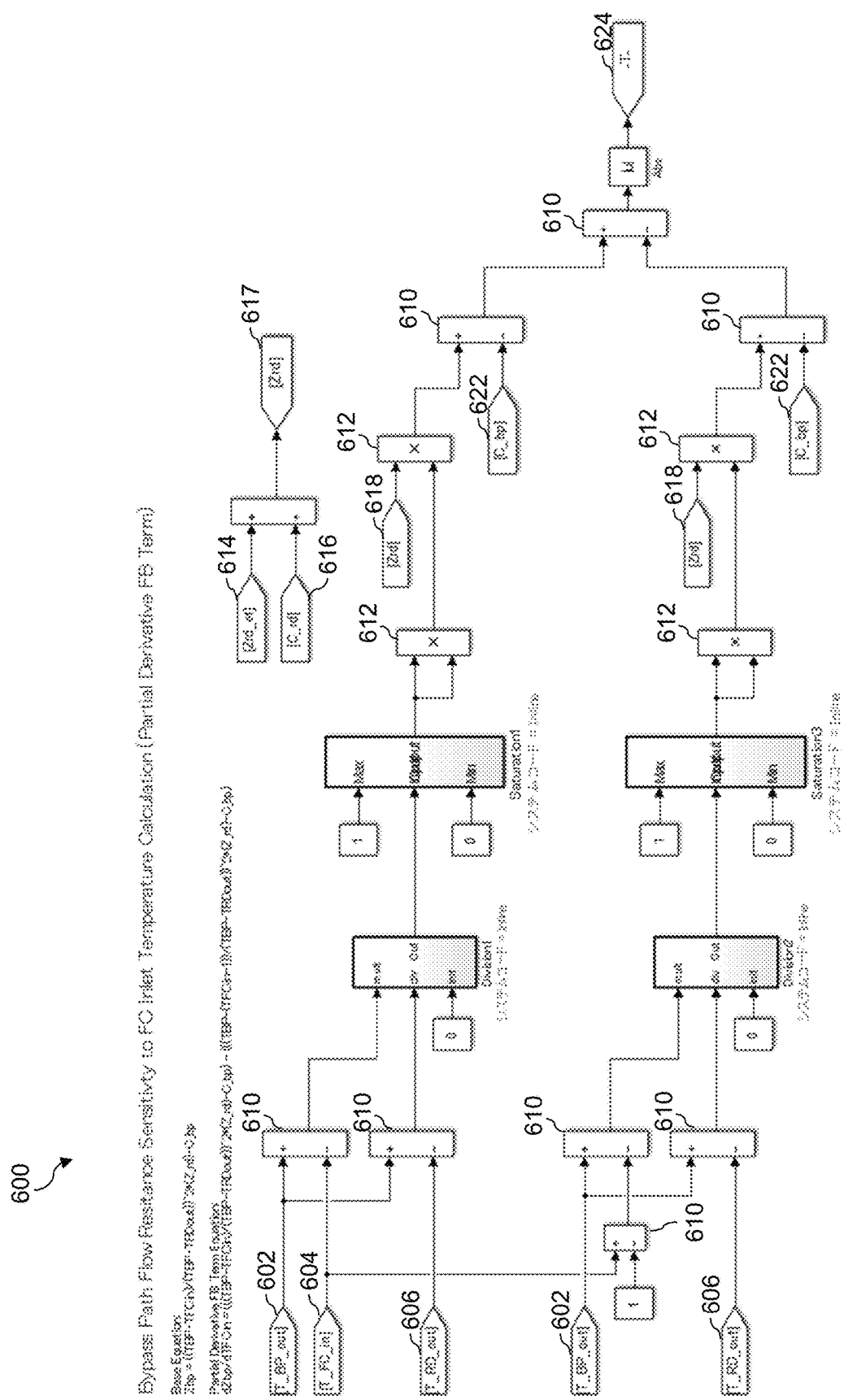
FIGS. 6-9 are block diagrams illustrating control logic for heating or cooling a fuel cell circuit according to an embodiment of the present invention.

The three-way valve controller 500 may further include a sensitivity block 518. The sensitivity block 518 may receive the difference 516 between the radiator temperature 512 and the bypass fluid temperature 514 along with a pump fluid temperature ($T_{pump\ in}$) 520 corresponding to a temperature of the fluid at an inlet of the pump. The sensitivity block 518 may determine a sensitivity 522 that corresponds a change in valve position of the three-way valve to a change in fluid temperature of the fluid, such as a fluid temperature at the inlet of the fuel cell stack. For example, the sensitivity 522 may indicate how much of a change in valve position (Z) results in a 1 degree (C.) change of the fluid temperature at the inlet of the fuel cell stack. The sensitivity 522 may be calculated using a partial derivative I-term as discussed above, and in particular, may be based on Equations 1-3 as set forth above. The implementation of this sensitivity 522 may allow the upper and lower limits to increase or decrease proportionally to the system response, which in turn may help prevent I-term wind-up. Control logic 600 associated with the sensitivity block 518 is shown in FIG. 6.

The three-way valve controller 500 may further include a multiplication block 524. The multiplication block 524 may apply the sensitivity 522 to the temperature difference 508. For example, the multiplication block 524 may multiply the temperature difference 508 by the sensitivity 522. The result of the multiplication block 524 may be an error signal 526, and may indicate an error in the three-way valve position (measured, for example, in values corresponding to the fluid split ratio).

Figure 7:
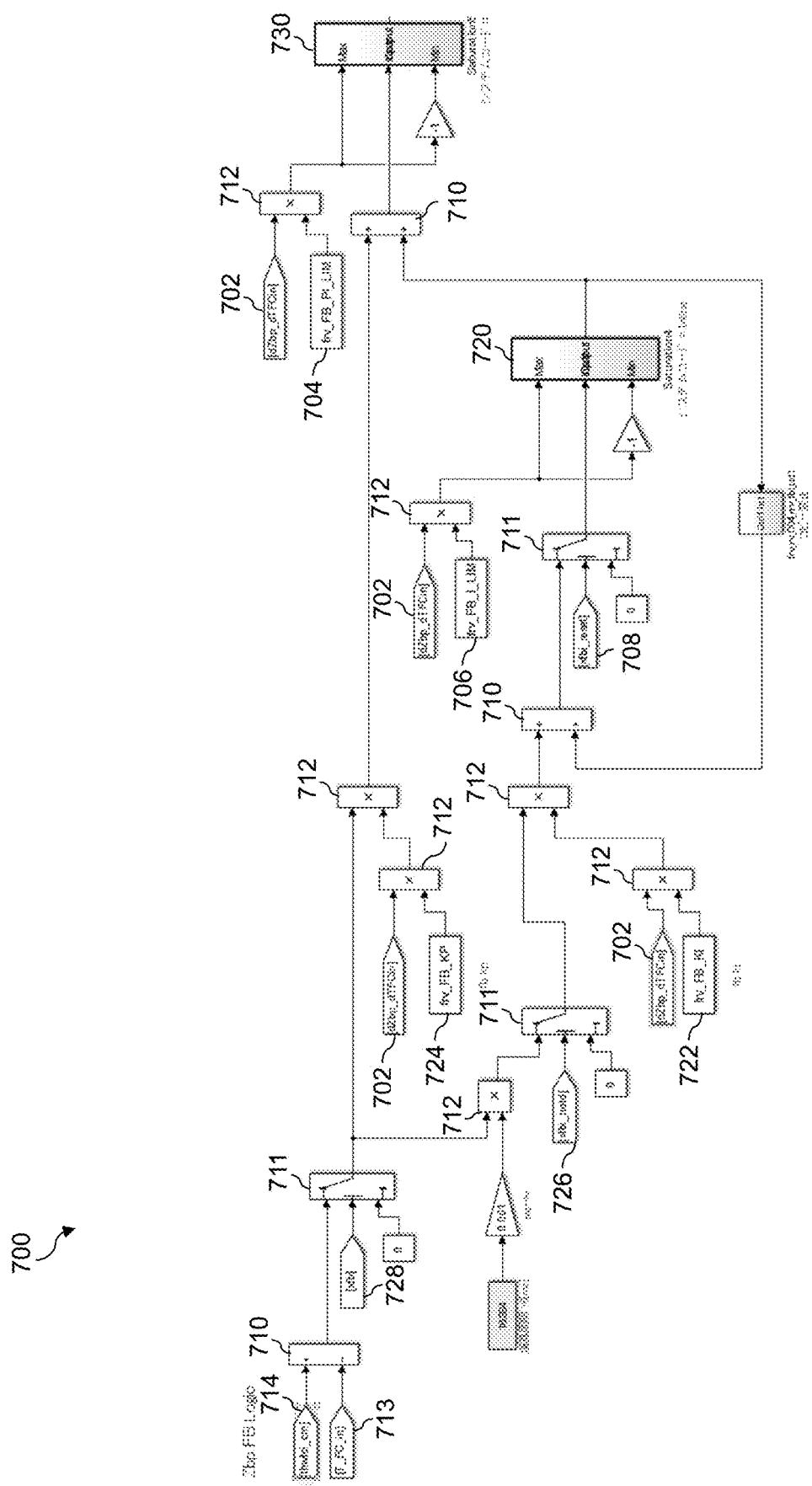

The three-way valve controller 500 may further include a proportional-integral-derivative (PID) controller 528. The PID controller 528 may receive the error signal 526 and may generate a feedback control signal 530 by accounting for present error values, past error values, and potential future errors of the error signal 526. In some implementations, the PID controller 528 is configured to apply the steps of method 400 to prevent I-term wind-up by limiting the total allowed contribution of state error. The PID controller 528 may apply Equations 4-7 as set forth above to the error signal 526 to produce a feedback control signal ($\Delta Z_{FB}$) 530. Control logic 700 associated with the PID controller 528 is shown in FIG. 7.

The ECU 102 may further include a combination block 532 that receives the feedback control signal 530 along with a feedforward control signal 534. The feedforward control signal 534 may correspond to a feedforward control of the three-way valve as determined or calculated by a feedforward control such as the feedforward control 312 of FIG. 3.

The combination block 532 may generate a sum of the feedback control signal 530 and the feedforward control signal 534. The combination block 532 may output a combined control signal 536 that corresponds to a final desired valve position of the three-way valve 500 based on feedforward and feedback control. The ECU 102 may control the three-way valve based on the final desired valve position.

Referring to FIG. 6, control logic 600 for the sensitivity block 518 of FIG. 5 is shown. In this example, equations are given representing the correction of bypass path flow resistance (Z). The flow resistance (Z) is then used to calculate the valve flow resistance. From there, the valve resistance is converted to the equivalent valve position. Other associated inputs 602, 604, 606, 614, 616, 618, outputs 617, 624, and comparison blocks 610, 612 are also shown in the control logic 600.

Referring to FIG. 7, control logic 700 for the PID controller 528 of FIG. 5 is shown. This control logic 700 includes the partial derivative feedback term produced by control logic 600 as inputs 702. The control logic also includes inputs 704 that represent the $\Delta \text{Controlled}_{state\ allowed}$ term in Equations 5 and 6 above, as well as inputs 706, 708, 713, 714, 724, 726, 728 and comparison blocks 710, multiplication blocks 712, and calculation blocks 711. In some implementations, calculation block 720 represents the partial derivative-based I-term wind-up prevention and calculation block 730 represents the PI-term maximum and minimum limits based on the partial derivative term.

Figure 8:
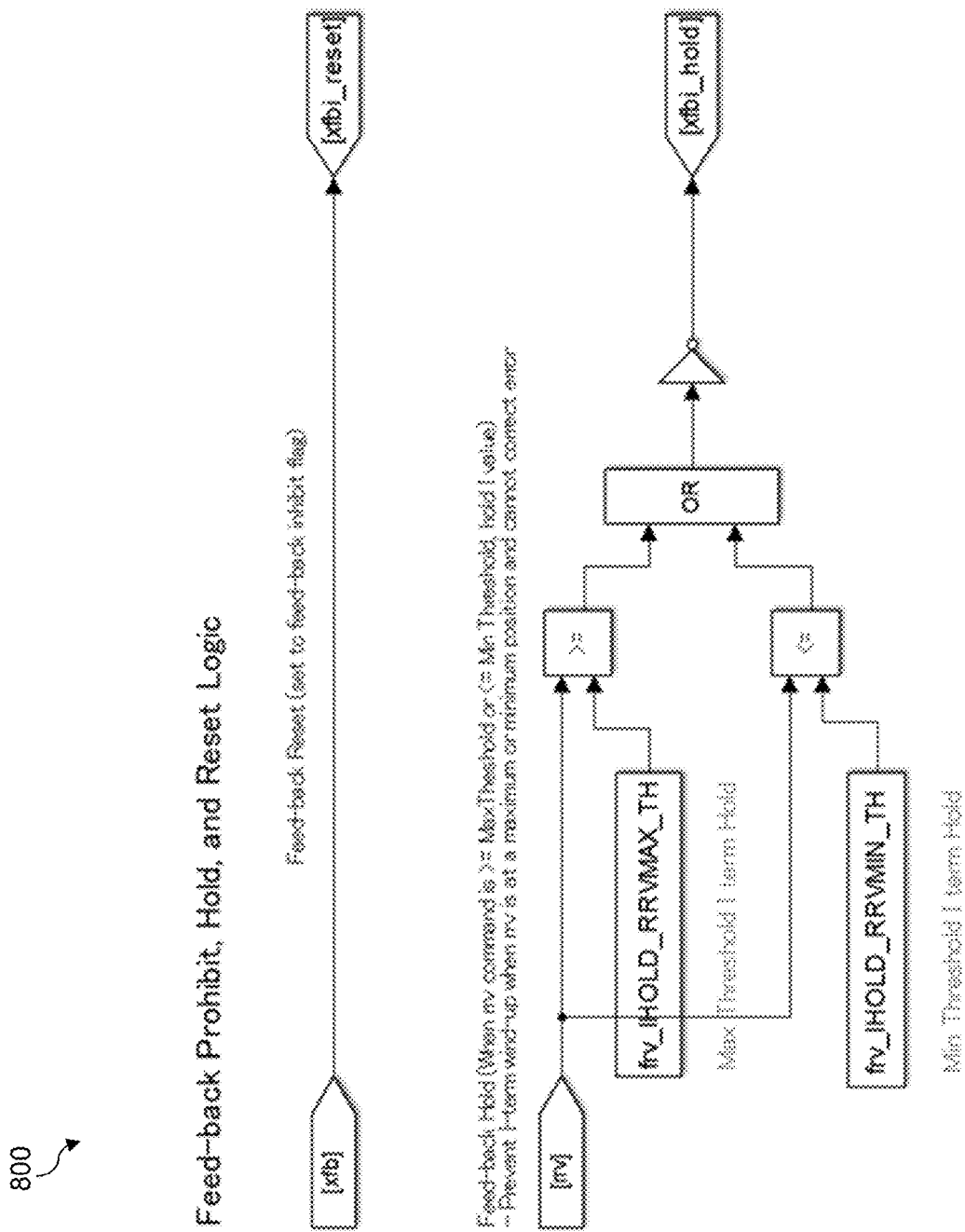
Figure 9:
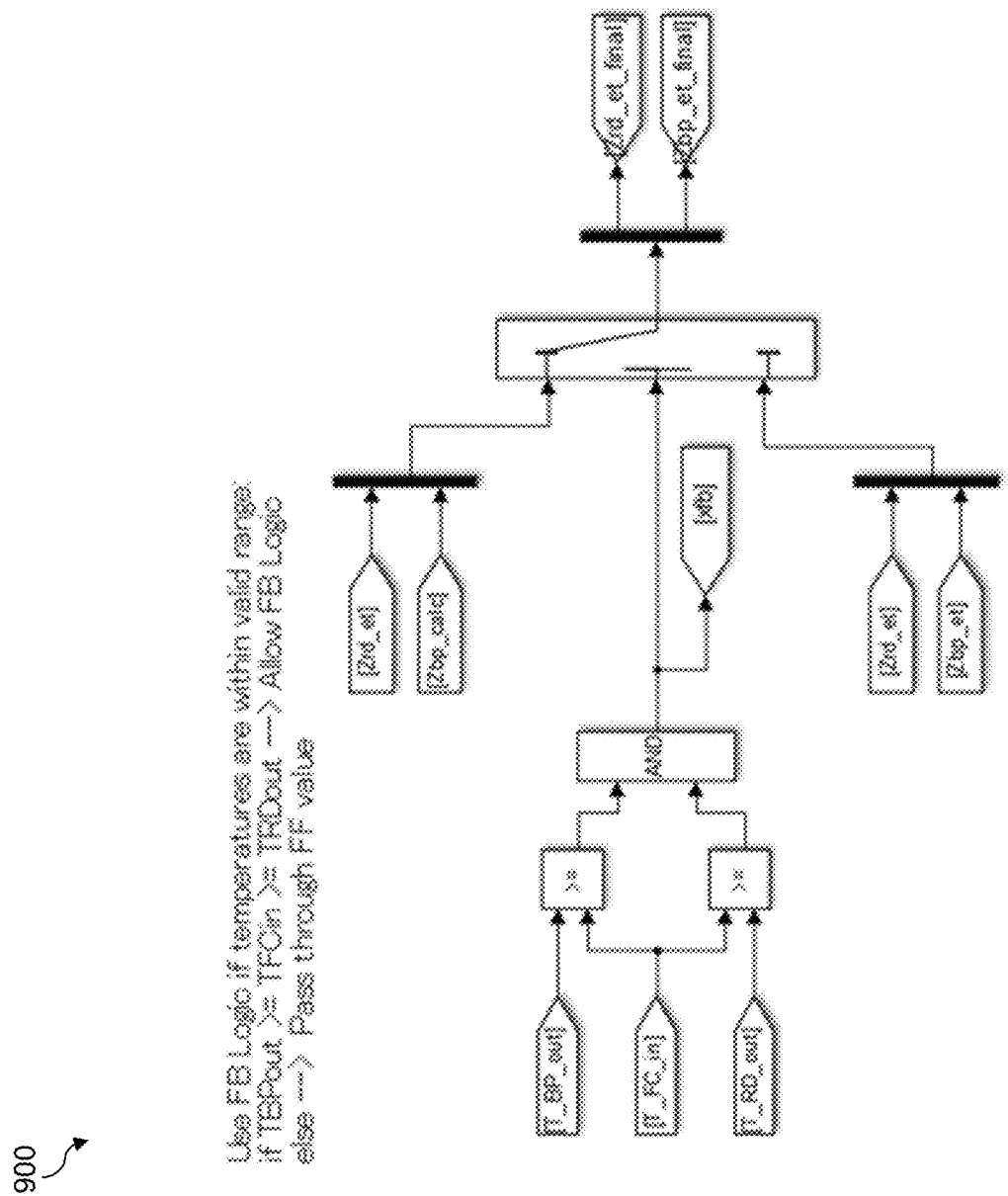

Referring to FIGS. 8 and 9, control logic 800 related to Feedback Prohibit, Hold, and Reset functions and control logic 900 related to passing through the Feedforward value is shown. In some implementations, the control logic 800 determines the feedforward block 312 and the control logic 900 determines the feedback block 316 in FIG. 3.

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. A system for heating or cooling a fuel cell stack of a vehicle, comprising:
   a fuel cell stack having a plurality of fuel cells;
   an actuator having an actuator position and configured to control fluid flow to increase or decrease a fluid temperature of a fluid in the plurality of fuel cells; and
   an electronic control unit (ECU) coupled to the actuator, the ECU including a proportional-integral-derivative (PID) controller; wherein the ECU is configured to:
      determine a temperature control signal corresponding to a target temperature of the fluid;
      perform feedforward control of the actuator with a feedforward control signal, the feedforward control signal configured to cause the actuator to control the fluid flow to increase or decrease the fluid temperature of the fluid toward the target temperature of the fluid;
      receive a feedback control signal from the PID controller, the feedback control signal based on an error signal that corresponds to an additional change in the actuator position to control the fluid flow to cause the fluid temperature of the fluid to increase or decrease to reduce a temperature difference, wherein the feedback control signal applies an I-term saturation limit calculated using a partial derivative term; and
      control the actuator based on a combination of the feedforward control signal and the feedback control signal.

2. The system of claim 1, wherein the PID controller is configured to generate the feedback control signal by accounting for present error values, past error values, and potential future errors of the error signal.

3. The system of claim 1, wherein the actuator is a three-way valve.

4. The system of claim 1, wherein the target temperature of the fluid and the fluid temperature of the fluid correspond to the fluid at an inlet of the fuel cell stack.

5. A method for heating or cooling a fuel cell stack of a vehicle, comprising:
   providing a fuel cell stack having a plurality of fuel cells;
   providing an actuator having an actuator position and configured to control fluid flow to increase or decrease a fluid temperature of a fluid in the plurality of fuel cells; and providing an electronic control unit (ECU) coupled to the actuator, the ECU including a proportional-integral-derivative (PID) controller;

with the ECU, determining a temperature control signal corresponding to a target temperature of the fluid;

with the ECU, performing feedforward control of the actuator with a feedforward control signal, the feedforward control signal configured to cause the actuator to control the fluid flow to increase or decrease the fluid temperature of the fluid toward the target temperature of the fluid;

with the ECU, receiving a feedback control signal from the PID controller, the feedback control signal based on an error signal that corresponds to an additional change in the actuator position to control the fluid flow to cause the fluid temperature of the fluid to increase or decrease to reduce a temperature difference, wherein the feedback control signal applies an I-term saturation limit calculated using a partial derivative term; and controlling the actuator based on a combination of the feedforward control signal and the feedback control signal.

6. The method of claim 5, further comprising generating the feedback control signal with the PID controller by accounting for present error values, past error values, and potential future errors of the error signal.

7. The method of claim 5, wherein the actuator is a three-way valve.

8. The method of claim 5, wherein the target temperature of the fluid and the fluid temperature of the fluid correspond to the fluid at an inlet of the fuel cell stack.

9. A system for heating or cooling a fuel cell circuit of a vehicle comprising:

a fuel cell stack having a plurality of fuel cells and configured to receive a fluid and to heat the fluid;

an actuator having an actuator position and configured to control fluid flow to increase or decrease a fluid temperature of the fluid; and an electronic control unit (ECU) coupled to the actuator, the ECU configured to:

determine a temperature control signal corresponding to a target temperature of the fluid;

perform feedforward control of the actuator with a feedforward control signal, the feedforward control signal configured to cause the actuator to control the fluid flow to increase or decrease the fluid temperature of the fluid towards the target temperature of the fluid;

determine a temperature difference between the fluid temperature of the fluid and the target temperature of the fluid;

determine a sensitivity that corresponds a change in a parameter value or the actuator position to a change in the fluid temperature of the fluid;

apply the sensitivity to the temperature difference to determine an error signal that corresponds to an additional change in the actuator position to control the fluid flow to cause the fluid temperature of the fluid to increase or decrease to reduce the temperature difference;

receive a feedback control signal from a proportional-integral-derivative (PID) controller, the feedback control signal based on the error signal, wherein the feedback control signal applies an I-term saturation limit calculated using a partial derivative term; and control the actuator based on the error signal.

10. The system of claim 9, wherein the PID controller is part of the ECU.

11. The system of claim 9, wherein the PID controller is configured to generate the feedback control signal by accounting for present error values, past error values, and potential future errors of the error signal.

12. The system of claim 9, wherein the actuator is a three-way valve.

13. The system of claim 9, wherein the target temperature of the fluid and the fluid temperature of the fluid correspond to the fluid at an inlet of the fuel cell stack.

14. The system of claim 9, wherein the ECU is further configured to control the actuator based on a combination of the feedforward control signal and the feedback control signal.

* * * * *